(12) United States Patent
Johnson

(10) Patent No.: US 7,730,908 B2
(45) Date of Patent: Jun. 8, 2010

(54) SELF SUPPORTING REINFORCED HEADER

(75) Inventor: Ronald B. Johnson, Wadsworth, OH (US)

(73) Assignee: Babcock & Wilcox Power Generation Group, Inc. (US)

( * ) Notice: Subject to any disclaimer, the term of this patent is extended or adjusted under 35 U.S.C. 154(b) by 754 days.

(21) Appl. No.: 11/686,437

(22) Filed: Mar. 15, 2007

(65) Prior Publication Data

US 2007/0221279 A1  Sep. 27, 2007

(51) Int. Cl.
*F16L 3/00* (2006.01)
(52) U.S. Cl. .................. 138/106; 138/172; 138/174; 138/DIG. 2
(58) Field of Classification Search .......... 138/106, 138/177, 174, DIG. 2; 248/74.1, 903
See application file for complete search history.

(56) References Cited

U.S. PATENT DOCUMENTS

| | | | | |
|---|---|---|---|---|
| 1,703,605 A | * | 2/1929 | Ballantyne | 138/106 |
| 2,005,699 A | * | 6/1935 | Gottwald | 285/61 |
| 2,099,756 A | * | 11/1937 | Seigle | 285/55 |
| 4,951,902 A | * | 8/1990 | Hardtke | 248/74.1 |
| 5,871,306 A | * | 2/1999 | Tilcox | 405/157 |
| 5,924,656 A | * | 7/1999 | Okada et al. | 248/73 |
| 2008/0149208 A1 | * | 6/2008 | Kurara et al. | 138/106 |

* cited by examiner

*Primary Examiner*—Patrick F Brinson
(74) *Attorney, Agent, or Firm*—Michael J. Seymour; Eric Marich

(57) ABSTRACT

A self supporting header has a horizontally extending header pipe of fiberglass reinforced plastic with a horizontal axis and a flange of fiberglass reinforced plastic connected to an outer surface of the header pipe by at least one web and extending along at least part of the horizontal extent of the header pipe. The at least one web extends vertically from at least one of the top and bottom of the header pipe and is connected to the flange. A reinforcing member or material is embedded in at least one of the flange and the at least one web and that has a greater modulus of elasticity than a modulus of elasticity of the fiberglass reinforced plastic of the header pipe reinforces a cross-section of the header for increasing the self supporting strength of the header. The reinforcing member may be made of metal or a carbon composite material.

20 Claims, 3 Drawing Sheets

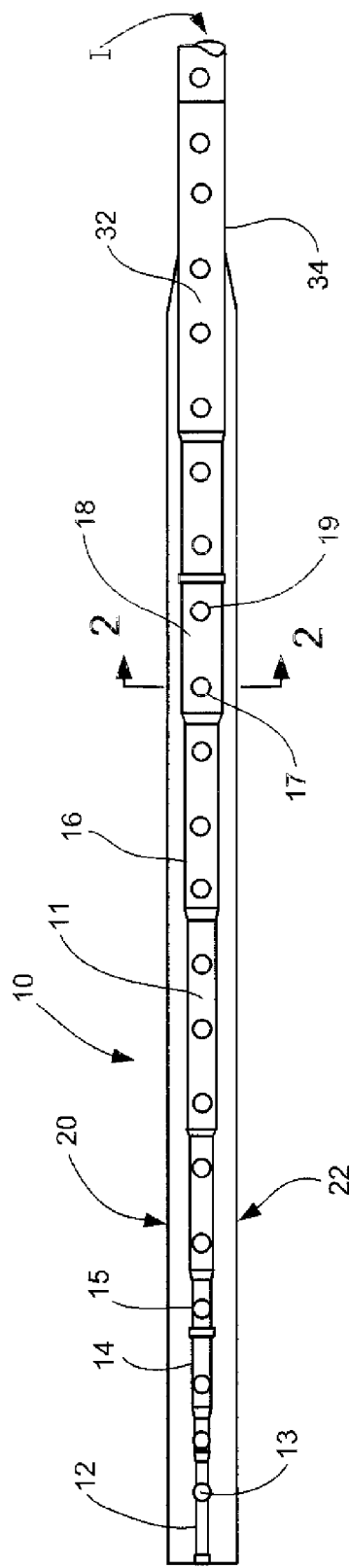
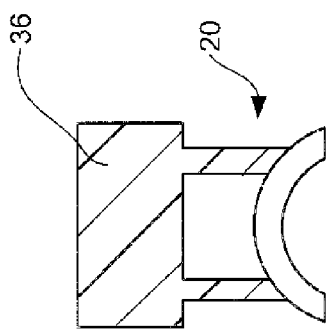
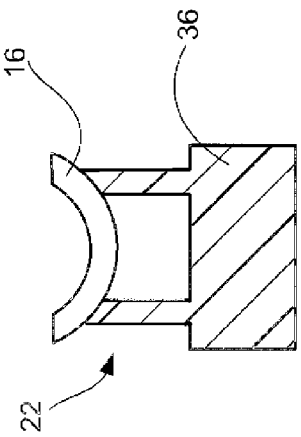
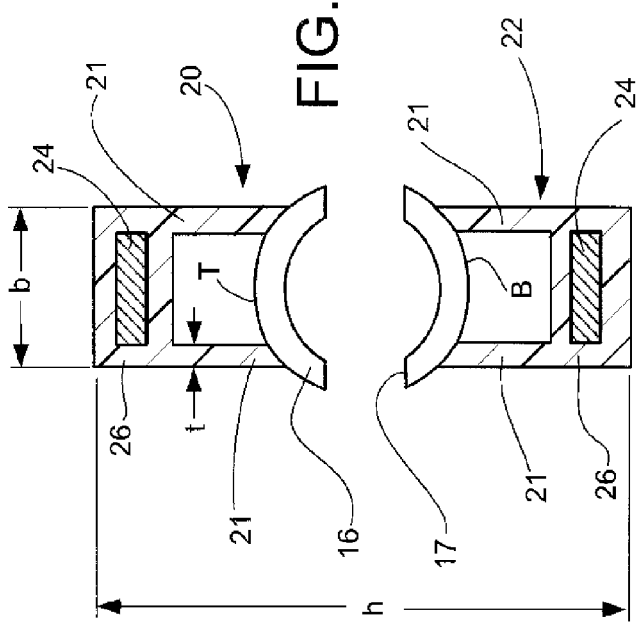
FIG. 1
FIG. 2
FIG. 3

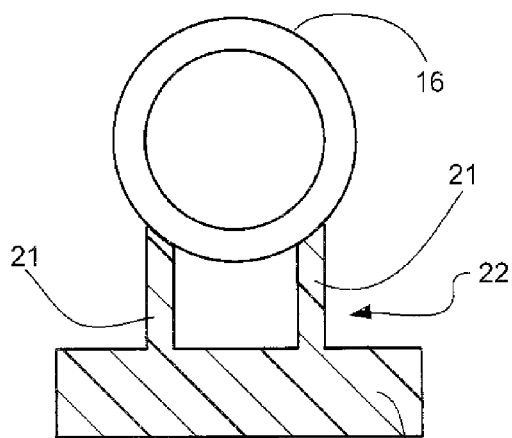
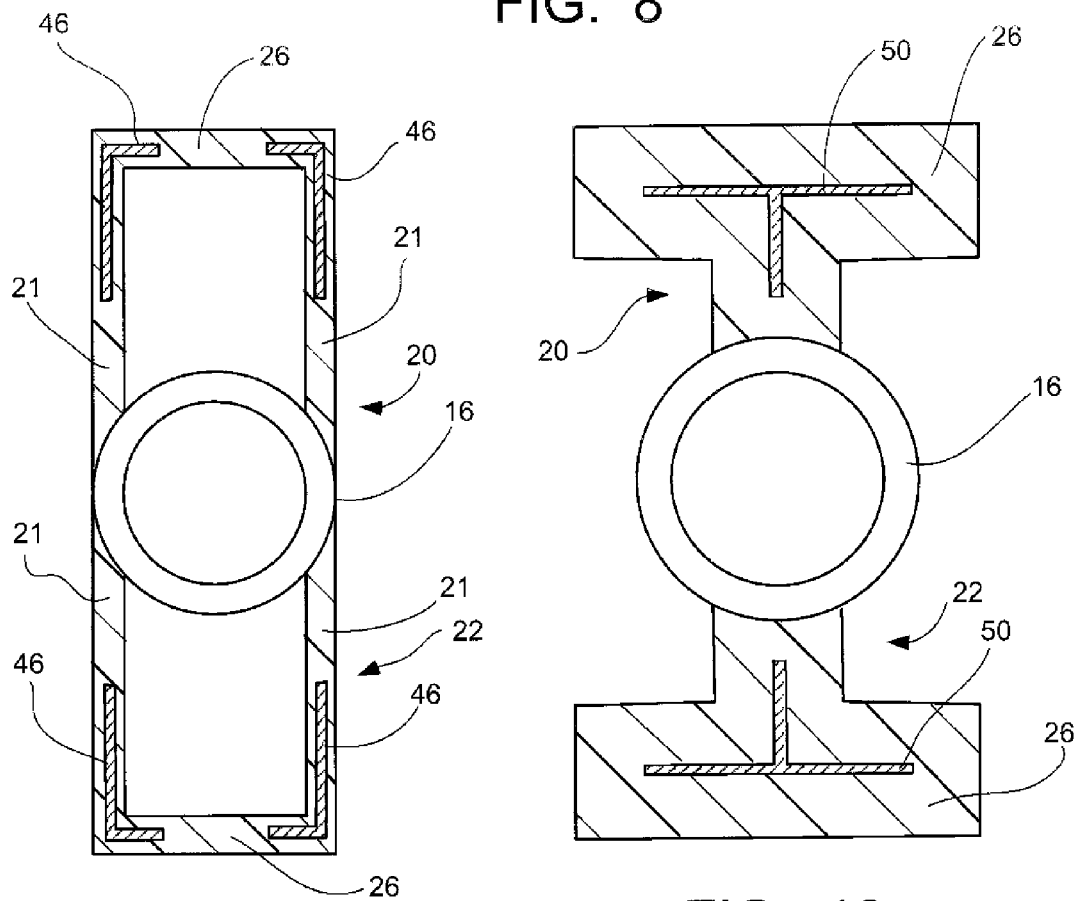
FIG. 8
FIG. 9
FIG. 10

SELF SUPPORTING REINFORCED HEADER

FIELD AND BACKGROUND OF THE INVENTION

Fiberglass reinforced plastic or FRP pipe is brittle and alone is limited to small unsupported spans due to its low allowable stress and large deflections compared to steel pipe. Significantly more piping supports are typically needed when FRP piping is used internally or externally for vessel components. In wet flue gas desulfurization or WFGD scrubber applications FRP spray headers are supported along their length by hanging them from multi-levels of large support beams with hanger brackets.

SUMMARY OF THE INVENTION

It is apparent that some of the above-identified cost issues could be overcome by providing a self supporting pipe or header which reduces or eliminates the costly supports which are typically used for such spray headers.

Accordingly, one aspect of the present invention is to provide a self supporting reinforced header which can span larger unsupported distances using FRP pipe and thereby eliminate the need for costly piping supports. In WFGD applications, self supporting spray headers have the potential to reduce cost not only in terms of the alloy support steel and brackets, but also in terms of overall scrubber vessel height and construction costs as well.

The invention utilizes the cross-section of the pipe, combined with an enhanced structural section to permit spanning large distances without the need for separate structural supports. The structural section may be FRP alone or a combination of FRP and other reinforcing elements. The addition of a structural element or member, such as a bar or other structural shape, which has greater stiffness than FRP, will permit an increased unsupported span length. If FRP is used without the structural element, span is limited or the depth of the cross-section of the pipe or header becomes undesirable.

The present invention provides a self supporting reinforced header. The header comprises a horizontally extending header pipe of fiberglass reinforced plastic, the header pipe having a horizontal axis. A flange of fiberglass reinforced plastic is connected to an outer surface of the header pipe by at least one web and extends along at least part of a horizontal extent of the header pipe. The at least one web extends vertically from at least one of the top and bottom of the header pipe by a selected amount and is connected to the flange. The flange has a metal reinforcing member embedded in at least one of the flange and the at least one web for reinforcing a cross-section of the header for increasing the self supporting strength of the header.

Accordingly, another aspect of the present invention is to provide a self supporting header having a horizontally extending header pipe of fiberglass reinforced plastic with a horizontal axis and a flange of fiberglass reinforced plastic connected to an outer surface of the header pipe and extending along at least part of the horizontal extent of the header pipe, the flange being with or without steel or other material reinforcing members and extending vertically from the top and/or the bottom of the header pipe by a selected amount for increasing the self supporting strength of the header.

The invention also provides a self supporting reinforced header comprising a horizontally extending header pipe of fiberglass reinforced plastic, the header pipe having a horizontal axis, and a flange of fiberglass reinforced plastic connected to an outer surface of the header pipe by at least one web and extending along at least part of the horizontal extent of the header pipe. The at least one web extends vertically from at least one of the top and bottom of the header pipe by a selected amount and is connected to the flange. The flange has a reinforcing member or material embedded in at least one of the flange and the at least one web that has a greater modulus of elasticity than a modulus of elasticity of the fiberglass reinforced plastic of the header pipe for reinforcing a cross-section of the header for increasing the self supporting strength of the header.

The various features of novelty which characterize the invention are pointed out with particularity in the claims annexed to and forming a part of this disclosure. For a better understanding of the inventions its operating advantages and specific benefits attained by its uses, reference is made to the accompanying drawings and descriptive matter in which preferred embodiments of the invention are illustrated.

BRIEF DESCRIPTION OF THE DRAWINGS

In the drawings:

FIG. 1 is a side elevational view of a self supporting header of the present invention;

FIG. 2 is a transverse sectional view of a first embodiment of a typical section of the header of FIG. 1;

FIG. 3 is a transverse sectional view of another embodiment of the header of the present invention;

FIG. 8 is a transverse sectional view of another embodiment of the header of the present invention;

FIG. 9 is a transverse sectional view of another embodiment of the header of the present invention; and FIG. 10 is a transverse sectional view of another embodiment of the header of the present invention.

DESCRIPTION OF THE PREFERRED EMBODIMENTS

Figure 4:
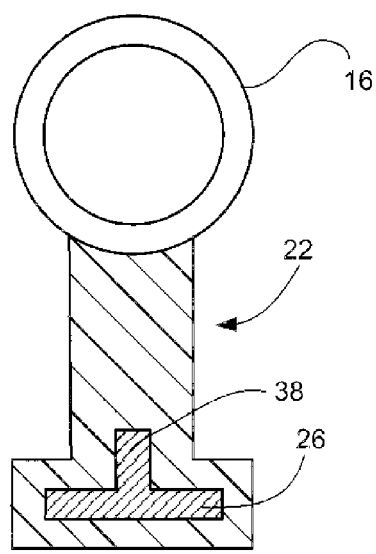
FIG. 4 is a transverse sectional view of another embodiment of the header of the present invention.

Referring now to the drawings, in which like reference numerals are used to refer to the same or functionally similar elements throughout the several drawings, FIG. 1 illustrates a side elevational view of a self supporting header or simply header 10 with various pipe diameters, for example at 12, 14, 16 and 18, and correspondingly different cross-sections along its length. The self supporting header 10 has particular application in WFGD scrubbers used to remove sulfur oxides from the flue gases produced by fossil fueled power plants used in the generation of electricity. The details of such WFGDs and their principles of operation are well known to those skilled in the art and will thus not be discussed in detail here. For the reader interested in such details, reference may be had to Chapter 35 of *Steam/its generation and use,* 41$^{st}$ Edition, Kitto and Stultz, Eds., Copyright© 2005, The Babcock & Wilcox Company, the text of which is hereby incorporated by reference as though fully set forth herein.

The self supporting header 10 illustrated would be typically one of many provided in the aforementioned WFGDs. During operation of a WFGD, each such header 10 would be used to convey a liquid slurry reagent to a plurality of branch pipes (not shown) which are connected to header 10 at a plurality of branch pipe connection holes such as those at 13, 15, 17 and 19, for example, and to which the branch pipes are fluidically connected. In the header 10 illustrated in FIG. 1, the liquid slurry reagent would be supplied at an inlet I to header 10 located at the right hand side of FIG. 1. The liquid slurry reagent is then conveyed along the length of header 10 to each of the branch pipe connection holes, and then out into the individual branch pipes which terminate in spray nozzles (also not shown) that spray the liquid slurry reagent into the flue gas to be scrubbed. The liquid slurry reagent supplied to the inlet I of header 10 is discharged from header 10 via the individual branch pipes and spray nozzles which are provided along the length of header 10, from the inlet I at the right hand side of FIG. 1 to the opposite end of header 10 located at the left hand side of FIG. 1.

Minimum flow velocities of the liquid slurry reagent within the header 10 must be maintained to prevent undesirable settling out of reagent particles as the liquid slurry reagent travels along header 10. Accordingly, header 10 is provided with an internal flow area which varies (reduces) from a maximum internal flow area at the inlet end I to a minimum flow area at an opposite end of header 10. By reducing the internal flow area along the length of header 10, the internal flow velocity of the liquid slurry is maintained at sufficiently high values to prevent such undesirable settling, while compensating for the fact that the amount of liquid slurry reagent flowing in header 10 decreases with length from the inlet I due to portions of the liquid slurry reagent being discharged from the branch pipes and spray nozzles along the length of the header 10. Thus, it will be observed that the header 10 is advantageously provided with a plurality of header 10 pipe sections of different diameters, e.g., diameters which increase in size from the left to the right of FIG. 1, with each pipe section being connected to the next larger diameter pipe section, each having typically one or more pairs of opposed branch pipe connection holes. For the sake of clarity, all of the pipe diameters and holes are not labeled in FIG. 1. In other words, going from right to left in FIG. 1, the diameters of the pipes making up the header pipe 10 are "necked down" either in the discrete steps illustrated in FIG. 1, or if desired, in a continuous manner. By way of example and not limitation, the pipe diameters for a typical header 10 may range from about 20" diameter down to about 4" diameter.

FIG. 2 illustrates a transverse sectional view of a first embodiment of the header 10 of FIG. 1. Shown is a typical FRP structural section of a header 10 which is vertically symmetrical with respect to a central horizontal axis of a header pipe 11 used to convey the liquid slurry reagent. A horizontally symmetrical structural section at the centerline of the header 10 has sufficient depth and moves the location of highest bending stress away from the header pipe 11 wall.

In a typical embodiment of FIG. 1, the header 10 may be about 60 ft. in total horizontal length. The FRP section shown in FIG. 2 has an overall height "h" and is provided with two webs each with an associated flange; i.e., an upper web 20 extending vertically from a top T of the header pipe 11, and a lower web 22 extending vertically from a bottom B of the header pipe 11. In this particular FIG. 1 embodiment, each of the upper and lower webs 20, 22 are comprised of a pair of spaced apart web plates 21 having a thickness "t" which are, in turn, connected to an associated upper or lower flange or cross piece 26. One web plate 21 down the middle which is equal to the combined thickness "t" of the two web plates 21 shown is equivalent in bending and would be an alternative structure. The selected amounts or values for the overall height "h" and thickness "t", for this embodiment as well as the others described later, are dependent upon the particular application. Each of the cross pieces or flanges 26 includes a reinforcing member 24, advantageously made of steel and in the form of a bar or plate, although cylindrical or other cross-sectional shapes (as described later) may be employed. The reinforcing member 24 is preferably completely embedded in the material of the webs 20, 22 and their associated cross pieces or flanges 26. This is important to prevent corrosion of the reinforcing member 24. If desired, this shape may be rotated so that the transverse width "b" of each cross piece or flange 26 is vertical, or any other structural shape (e.g., tee, channel, wide flange, etc.) can be substituted as needed to suit span requirements. A variety of materials can be used for the reinforcing member 24, instead of steel, such as carbon composites, or other non-metal composites. The main functional requirement of the reinforcing member 24 is that the reinforcing member or material 24 embedded in at least one of the flanges 26 and/or at least one web 20, 22 has a greater modulus of elasticity than the modulus of elasticity of the fiberglass reinforced plastic of the header pipe 11, thereby reinforcing a cross-section of the header 10 for increasing the self supporting strength of the header 10.

The deflection of the self supporting header 10 will depend on the elastic moduli and the moment of inertia of the structural element and FRP cross-sections. A structural shape like a tee may also promote the attachment of the contact molded FRP structural section. The structural reinforcement or flanges 26 in FIGS. 1 and 2 is reduced to nothing at 34 (FIG. 1), near the right hand end of the largest pipe diameter 32 since larger diameters need less flexural stiffening.

As one example of a self supporting reinforced header according to the teachings of the present invention, the wall thickness "t" of the web plates 21, and the portions of the cross pieces or flanges 26 above and below the reinforcing members 24 of the flanges 26 are each about ½ inch. The reinforcing members 24 may be about 1" thick and 6" wide while the transverse thickness of each flange 26 may be about 7". The total combined height "h" of the webs 20, 22, flanges 26 and pipe 16 along the header may be about 28", up until the flanges 26 start to reduce in vertical size at location 34 at the right hand end of the header pipe 11 at pipe section 32.

Alternative self supporting reinforced header design cross-sections, with and without steel or other embedded material reinforcements 24, are shown in the remaining figures.

In FIG. 3, the transverse upper and lower reinforcing flanges 26 extend slightly beyond the vertical sides of the web plates 21 of the upper and lower webs 20, 22, and may be made of FRP or other material, to substantially form an I-beam in cross-section.

In FIG. 4, only a lower web 22 is provided and it contains a T-shaped reinforcing member 38 embedded therein, with an upright pointing toward the pipe 16, and a cross member that is slightly less wide than the outside diameter of the pipe 16.

Figure 5:
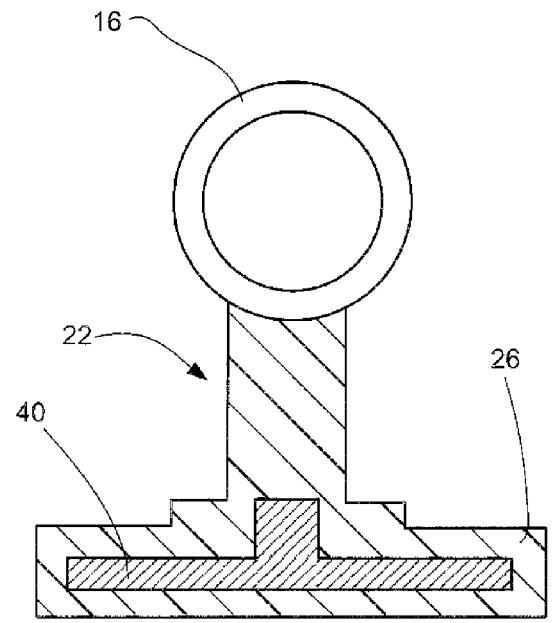
FIG. 5 is a transverse sectional view of another embodiment of the header of the present invention.
Figure 6:
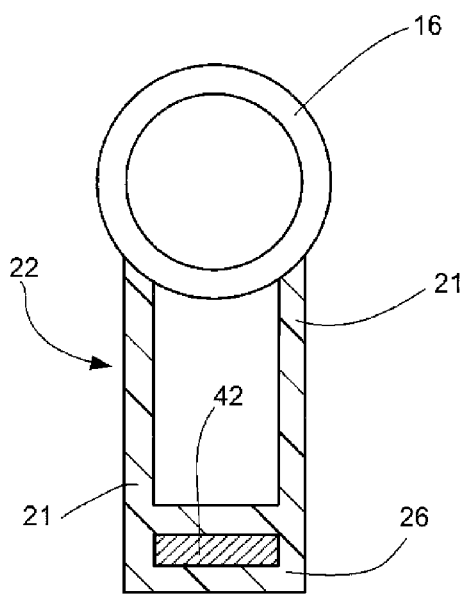
FIG. 6 is a transverse sectional view of another embodiment of the header of the present invention.

In FIG. 5, pipe 16 has only a lower web 22 with a T-shaped metal or other material reinforcing member 40 that is wider than the diameter of the pipe 16. In FIG. 6 a steel reinforcing plate member 42 is embedded inside the lower flange 26 and in FIG. 7 an FRP structural element 44 extends across the web plates 21 of the lower web 22.

Figure 7:
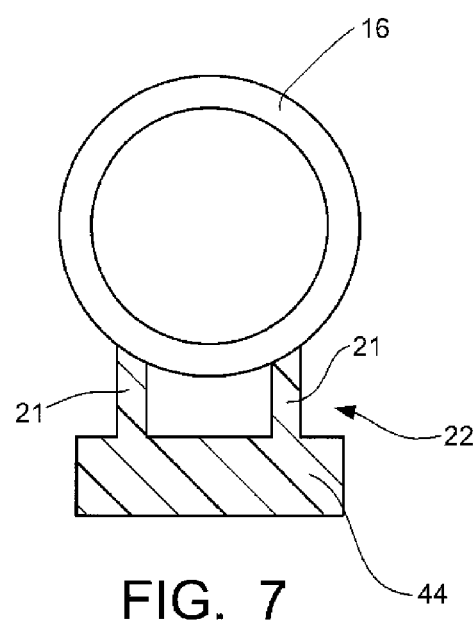
FIG. 7 is a transverse sectional view of another embodiment of the header of the present invention.

FIG. 8 shows an embodiment that is similar to that of FIG. 7 but with a structural element cross plate or flange 47 connected to and extending beyond the web plates 21 and made of FRP or other material.

In FIG. 9, the upper and lower webs 20, 22 are provided as pairs of web pieces 21 connected to cross piece 26, each with an L-shaped reinforcing member 46 at each of the outer corners where the web pieces 21 and cross pieces 26 meet. In FIG. 10, the upper and lower 20, 22 webs and flanges 26 provide a T-shape and are made of FRP with T-shaped steel or other material reinforcing members 50 therein. In each case where the reinforcing member is provided it may be steel or other metal, or other material that has a greater modulus of elasticity than the modulus of elasticity of the fiberglass reinforced plastic of the header pipe for reinforcing a cross-section of the header for increasing the self supporting strength of the header. The reinforcing member may also be a non-metal composite having some particularly selected material properties, such as the coefficient of thermal expansion, which closely match those of the FRP, thereby reducing stresses at the bond interface between the FRP and the embedded reinforcing member.

While specific embodiments of the invention have been shown and described in detail to illustrate the application of the principles of the invention, it will be understood that the invention may be embodied otherwise without departing from such principles. For example, the present invention may be applied in new construction involving WFGDs, or to the repair, replacement, and modification or retrofitting of existing WFGDs. Thus, while the present invention has been described above with reference to particular means, materials, and embodiments, it is to be understood that this invention may be varied in many ways without departing from the spirit and scope thereof, and therefore is not limited to these disclosed particulars but extends instead to all equivalents within the scope of the following claims.

What is claimed is:

1. A self supporting reinforced header comprising:
   a horizontally extending header pipe of fiberglass reinforced plastic, the header pipe having a horizontal axis; and
   a flange of fiberglass reinforced plastic connected to an outer surface of the header pipe by at least one web and extending along at least part of a horizontal extent of the header pipe, the at least one web extending vertically from at least one of the top and bottom of the header pipe by a selected amount and connected to the flange, the flange having a metal reinforcing member embedded in at least one of the flange and the at least one web for reinforcing a cross-section of the header for increasing the self supporting strength of the header.

2. The self supporting reinforced header of claim 1, wherein the embedded metal reinforcing member comprises at least one bar.

3. The self supporting reinforced header of claim 1, wherein the embedded metal reinforcing member comprises at least one plate.

4. The self supporting reinforced header of claim 1, comprising at least two webs, one web extending vertically from the top of the header pipe and another web extending from the bottom of the header pipe, each web connected to a flange having a metal reinforcing member embedded in at least one of the web and the flange for reinforcing a cross-section of the header for increasing the self supporting strength of the header.

5. The self supporting reinforced header of claim 1, comprising at least two pairs of webs, a first web pair extending vertically from the top of the header pipe and the second web pair extending from the bottom of the header pipe, each web pair connected to a flange having a metal reinforcing member embedded in at least one of the web and the flange for reinforcing a cross-section of the header for increasing the self supporting strength of the header.

6. The self supporting reinforced header of claim 5, wherein each of the webs in a pair of webs are spaced apart from each other.

7. The self supporting reinforced header of claim 4, wherein the header pipe, webs and flanges substantially form an I-beam in cross-section.

8. The self supporting reinforced header of claim 5, wherein the header pipe, webs and flanges substantially form an I-beam in cross-section.

9. The self supporting reinforced header of claim 1, wherein the header pipe is necked down along the horizontal axis.

10. The self supporting reinforced header of claim 1, wherein the header pipe contains a plurality of connecting holes spaced along the horizontal axis.

11. The self supporting reinforced header of claim 1, comprising at least two pairs of webs, a first web pair extending vertically from the top of the header pipe and the second web pair extending from the bottom of the header pipe, a cross piece connected to and extending across each web pair, and an L-shaped metal reinforcing member embedded in the cross pieces and their respective web pairs at the location where each cross piece connects to its respective web pair.

12. The self supporting reinforced header of claim 1, wherein the at least one web comprises a pair of spaced apart side plates and a cross piece with a metal reinforcing member embedded within the cross piece.

13. The self supporting reinforced header of claim 4, wherein the web and flange connected thereto is T-shaped with an upright part connected to the header pipe and a cross part connected to the upright part.

14. The self supporting reinforced header of claim 13, wherein the metal reinforcing member is embedded in the web and flange and has a T-shaped cross-section.

15. A self supporting reinforced header comprising:
    a horizontally extending header pipe of fiberglass reinforced plastic, the header pipe having a horizontal axis;
    a flange of fiberglass reinforced plastic connected to an outer surface of the header pipe by at least one web and extending along at least part of the horizontal extent of the header pipe, the at least one web extending vertically from at least one of the top and bottom of the header pipe by a selected amount and connected to the flange, the flange having a reinforcing member or material embedded in at least one of the flange and the at least one web that has a greater modulus of elasticity than a modulus of elasticity of the fiberglass reinforced plastic of the header pipe for reinforcing a cross-section of the header for increasing the self supporting strength of the header.

16. The self supporting reinforced header of claim 15, wherein the embedded reinforcing member or material comprises a non-metal composite member.

17. The self supporting reinforced header of claim 15, comprising at least two webs, one web extending vertically from the top of the header pipe and another web extending from the bottom of the header pipe, each web connected to a flange having a carbon composite reinforcing member embedded in at least one of the webs and the flanges for reinforcing a cross-section of the header for increasing the self supporting strength of the header.

18. The self supporting reinforced header of claim 15, comprising at least two pairs of webs, a first web pair extending vertically from the top of the header pipe and the second web pair extending from the bottom of the header pipe, each web pair connected to a flange having a carbon composite reinforcing member embedded in at least one of the webs and the flanges for reinforcing a cross-section of the header for increasing the self supporting strength of the header.

19. The self supporting reinforced header of claim 15, wherein the at least one web comprises an upright part connected to the header pipe and a cross piece connected to the upright part and wherein the reinforcing member is a carbon composite member having a T-shaped cross-section.

20. The self supporting reinforced header of claim 15, wherein the at least one web comprises a pair of spaced apart side plates and a cross piece with a carbon composite reinforcing member embedded within at least one of the side plates and the cross piece.

* * * * *